United States Patent
Feng

(10) Patent No.: US 7,697,685 B1
(45) Date of Patent: *Apr. 13, 2010

(54) DATA DEPENDENT SCRAMBLER WITH REDUCED OVERHEAD

(75) Inventor: Weishi Feng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 7 days.

This patent is subject to a terminal disclaimer.

(21) Appl. No.: 12/342,263

(22) Filed: Dec. 23, 2008

Related U.S. Application Data

(63) Continuation of application No. 10/715,551, filed on Nov. 17, 2003, now Pat. No. 7,469,049.

(60) Provisional application No. 60/451,875, filed on Mar. 4, 2003.

(51) Int. Cl.
*H04L 9/00* (2006.01)
*H04L 9/32* (2006.01)
*H04N 7/167* (2006.01)
*H04N 5/913* (2006.01)

(52) U.S. Cl. .............. 380/210; 380/200; 714/758; 714/752; 714/781; 713/189; 713/193

(58) Field of Classification Search .................. None
See application file for complete search history.

(56) References Cited

U.S. PATENT DOCUMENTS

| | | | |
|---|---|---|---|
| 5,377,265 A | 12/1994 | Wettengel et al. | |
| 5,712,863 A | 1/1998 | Gray | |
| 5,815,514 A | 9/1998 | Gray | |
| 5,898,394 A | 4/1999 | Kobayashi et al. | |
| 5,931,968 A | 8/1999 | Gray | |
| 6,177,890 B1 | 1/2001 | Keirn et al. | |
| 6,260,171 B1 | 7/2001 | Gray | |
| 6,308,295 B1 | 10/2001 | Sridharan et al. | |
| 6,363,512 B2 | 3/2002 | Gray | |
| 6,438,724 B1 | 8/2002 | Cox et al. | |
| 6,513,139 B2 | 1/2003 | Gray | |
| 6,557,136 B1 | 4/2003 | Friedmann | |
| 6,631,490 B2 * | 10/2003 | Shimoda | 714/755 |
| 6,897,792 B1 * | 5/2005 | Feng | 341/59 |
| 7,006,016 B1 | 2/2006 | Feng | |
| 7,020,833 B2 * | 3/2006 | Watanabe et al. | 714/798 |
| 7,158,058 B1 * | 1/2007 | Yu | 341/58 |
| 7,194,346 B2 | 3/2007 | Griffin | |

(Continued)

FOREIGN PATENT DOCUMENTS

EP      0926671 A1      6/1999

OTHER PUBLICATIONS

USPTO Non-Final Office Action mailed Mar. 14, 2008 for U.S. Appl. No. 10/715,551, filed Nov. 17, 2003.

(Continued)

*Primary Examiner*—Syed A. Zia

(57) ABSTRACT

A scrambling system includes a seed finder that selects a scrambling seed. A first scrambler generates a scrambled sequence in response to a user data sequence and the scrambling seed. A code finder generates at least one of a token and an offset of the token from the scrambling seed. An encoder increases a Hamming weight of the scrambled sequence in response to at least one of the token and the offset.

18 Claims, 6 Drawing Sheets

U.S. PATENT DOCUMENTS

| | | |
|---|---|---|
| 7,218,255 B1 | 5/2007 | Feng |
| 7,234,097 B1 * | 6/2007 | Feng et al. ............... 714/758 |
| 7,248,188 B2 | 7/2007 | Ito et al. |
| 7,269,778 B1 | 9/2007 | Feng et al. |
| 7,318,185 B2 * | 1/2008 | Khandani et al. .......... 714/758 |
| 2002/0044767 A1 | 4/2002 | Kwak |
| 2002/0049949 A1 | 4/2002 | Shimoda |
| 2003/0044005 A1 | 3/2003 | Lee et al. |
| 2003/0135798 A1 * | 7/2003 | Katayama et al. ........... 714/710 |
| 2004/0010747 A1 * | 1/2004 | Hewitt et al. ............... 714/793 |
| 2006/0220928 A1 * | 10/2006 | Ito et al. ..................... 341/50 |

OTHER PUBLICATIONS

Amendment filed Apr. 30, 2008 in response to USPTO Non-Final Office Action mailed Mar. 14, 2008 for U.S. Appl. No. 10/715,551, filed Nov. 17, 2003.

\* cited by examiner

DATA DEPENDENT SCRAMBLER WITH REDUCED OVERHEAD

CROSS-REFERENCE TO RELATED APPLICATIONS

This application is a continuation of U.S. patent application Ser. No. 10/715,551, filed Nov. 17, 2003, which claims the benefit of U.S. Provisional Application No. 60/451,875 filed Mar. 4, 2003, which are hereby incorporated by reference in their entirety.

FIELD OF THE INVENTION

The present invention relates to data coding in a communications channel, and more particularly to data coding that reduces unwanted bit patterns in a communications channel with reduced overhead.

BACKGROUND OF THE INVENTION

Magnetic storage systems such as disk drives include a magnetic medium or platter with a magnetic coating that is divided into data tracks. The data tracks are divided into data sectors that store fixed-sized data blocks. A read/write head typically includes a write circuit and write element such as an inductor that selectively generates positive and negative magnetic fields that are stored by the magnetic medium. The stored positive and negative fields represent binary ones and zeros. The read/write head includes an element such as a magneto-resistive element that senses the stored magnetic field to read data from the magnetic medium. A spindle motor rotates the platter and an actuator arm positions the read/write head relative to the magnetic medium.

Magnetic storage systems typically code the user data sequence or user data using Run Length Limited (RLL) code. RLL coding reduces sequences in the user data that may cause problems with timing circuits of the magnetic storage system. For example, a RLL code enforces constraints on the number of consecutive ones and/or zeros that are allowed to occur in the data. The efficiency of the RLL code is typically measured in terms of a code rate. For every m-bits or m-bytes of user data, an n-bit or n-byte encoded word is written to the storage media. RLL codes are used to eliminate unwanted bit patterns in the data and typically do not have error correction capability. RLL coding, however, reduces data storage capacity by increasing channel bit density (CBD), which reduces a signal to noise ratio (SNR) and may lead to lower reliability.

Referring now to FIG. 1, a write-path of a data storage system with RLL coding is shown. A host bus interface (HBI) 14 receives user data from a host computer 16. A buffer manager (BM) 18 initially stores the user data in a buffer 20 and then sends the user data from the buffer 20 to a disk formatter (DF) 22 with proper timing. An ECC/CRC encoder 24 appends CRC bits to the user data. The CRC bits are calculated based on the user data. ECC bits are computed based on the user data and the CRC bits and appended thereto. A scrambler 26 generates a pseudo-random scrambling sequence that is based on a polynomial and seed. The user data and the scrambling sequence are input to an XOR gate 27, which outputs scrambled user data. A RLL encoder 28 is used to constrain the unwanted bit patterns in the scrambled user data sequence.

To increase SNR and data storage capacity, data storage systems were developed without RLL coding using data-dependent scramblers (DDS). Data is processed by the DDS to eliminate unwanted bit patterns. The DDS is disclosed in "Improved Data Coding For Enforcing Constraints On Ones and Zeros In a Communications Channel", U.S. patent application Ser. No. 10/423,552, filed Apr. 25, 2003, which is commonly assigned and is hereby incorporated by reference in its entirety. The scrambled user data from the DDS is forwarded to an ECC/CRC encoder, which generates and appends CRC and ECC bits to the DDS coded user data.

Because the CRC and ECC bits may also contain unwanted bit patterns, traditional RLL coding may be used to encode the ECC/CRC portion. The data storage system is still referred to as being without RLL coding because the CRC and/or ECC bits are relatively small in number as compared to the number of bits in the user data. In data storage systems without RLL coding, the CRC bits are generated and appended by the ECC/CRC encoder. Because the ECC/CRC encoder is located downstream from other devices, such as the disk formatter (DF), the buffer manager (BM), the buffer, etc., the CRC bits that are generated do not detect errors that are generated in these devices.

Referring now to FIG. 2, a write-path of a data storage system that includes the DDS is shown. The host computer 16 generates user data that is transferred to the host bus interface (HBI) 14. The buffer manager (BM) 18 receives the user data from the HBI 14 and controls the data flow through the write path. The user data is periodically stored in the buffer 20. The BM 18 passes the user data on based on sequence timing of data flow through the write path. The disk formatter (DF) 22 receives the user data from the BM 18 and formats the user data.

A data dependent scrambler (DDS) 40 receives the user data from the DF 22 and scrambles the user data using a data dependent scrambling seed (S) to eliminate the unwanted bit patterns. Other encoding and/or scrambling may optionally be performed to improve the Hamming weight of adjacent symbols using an H-code token (H) and/or to limit the number of zeros in interleaved subsequences. The scrambling seed (S) and the H-code token (H) are appended to the user data sequence, which increases overhead. An ECC/CRC encoder 42 appends CRC bits that are calculated based on the scrambled user data. ECC bits are also computed based on the scrambled user data and the CRC bits and appended to the scrambled user data.

If the DDS performs H-code coding and data dependent scrambling, the DDS needs to append the scrambling seed (S) and the H-code token (H) to the user data sequence. For example, when the user data corresponds to a sector including 4096 bits arranged as 410 10 bit symbols, the DDS coding rate is equivalent to a 410/412 RLL code. As can be appreciated further reductions to the overhead would be desirable.

SUMMARY OF THE INVENTION

Accordingly, the present invention provides a data dependent scrambler for a communications channel that receives a user data sequence including X bits that are organized as N M-bit symbols. The data dependent scrambler includes a seed finder that generates a scrambling seed that is dependent upon the symbols in the user data sequence. A first scrambler receives the user data sequence from the data buffer and the scrambling seed from the seed finder and generates the scrambled user data sequence. An H-code finder generates at least one of an H-code token that is dependent upon the symbols in the user data sequence and an offset of the H-code token from the scrambling seed. An H-code encoder receives the scrambled user data sequence and at least one of the H-code token and the offset. The H-code encoder increases a Hamming weight of the scrambled user data sequence using the at least one of the H-code token and the offset.

In one feature, at least one of the symbols of the user data sequence includes dummy bits. The H-code encoder stores the offset in the dummy bits. The user data sequence includes Y dummy bits. Y is equal to M minus a remainder of X divided by M.

In another feature, the data dependent scrambler includes a data buffer that stores the user data sequence until the scrambling seed is generated.

In another feature, the data dependent scrambler receives the user data sequence.

In another feature, the data dependent scrambler further includes an ECC/CRC encoder that encodes the scrambled user data sequence. The ECC/CRC encoder appends ECC and CRC bits to the scrambled user data sequence. The ECC/CRC encoder outputs the scrambled user data sequence to a run length limited (RLL) encoder that generates a RLL sequence that is based on the ECC and CRC bits.

In another feature, the data dependent scrambler further includes an interleaving encoder that receives the scrambled user data sequence from the H-code encoder. The interleaving encoder reduces the number of consecutive zeros in interleaved subsequences of the scrambled user data.

In still another feature, the data dependent scrambler is implemented in a write path of a data storage system.

In yet another feature, the first scrambler performs a bitwise exclusive (XOR) operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
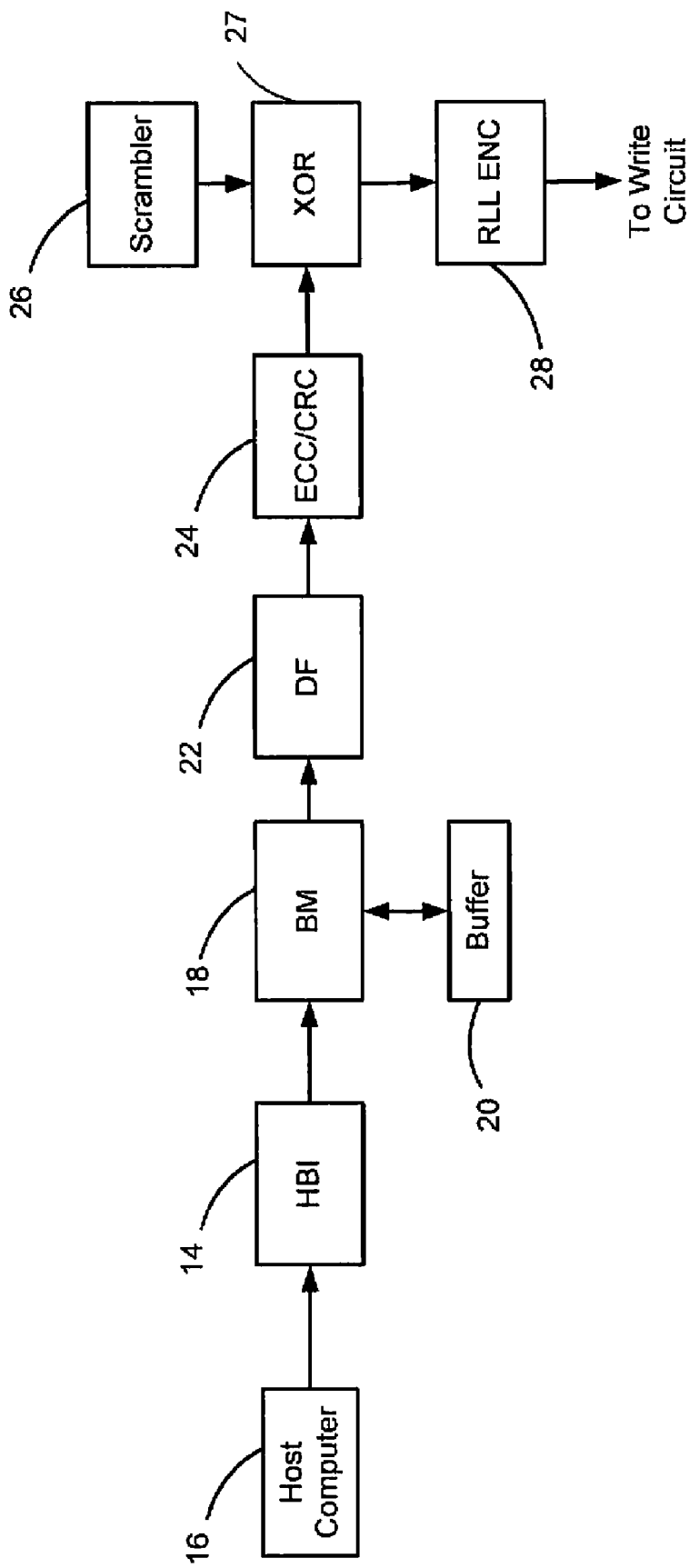
FIG. 1 is a functional block diagram of a data storage system with RLL coding according to the prior art.

The following description of the preferred embodiments is merely exemplary in nature and is in no way intended to limit the invention, its application, or uses. For purposes of clarity, the same reference numbers will be used in the drawings to identify similar elements.

While the present invention will be described in the context of a data storage system, skilled artisans will appreciate that the present invention can be applied to any binary communications channel with constraints on the number of consecutive ones or zeros. As will be described further below, the data storage system according to the present invention does not employ RLL coding on a user data portion. The present invention discloses a coding technique that eliminates unwanted bit patterns with a smaller reduction in data storage capacity as compared to RLL coding. In other words, the coding technique according to the present invention reduces the channel bit density (CBD) less than data storage systems using RLL coding on the user data. As used herein, the term data dependent scrambler (DDS) is defined as a scrambler that alters at least one of a selected scrambler, a generating polynomial, a seed, and a scrambling sequence based upon current user data that is to be scrambled.

The present invention further reduces the overhead of the DDS by taking advantage of dummy bits in the user data sequence. When a sector having X bits is organized into symbols each having M bits, there are N=X/M symbols for each sector (where N is a rounded-up integer value). If there is a remainder when dividing X by M, dummy bits are used to fill out the remaining bits of the symbol or symbols with fewer than M bits. For example, when X=4096 and N=410, one of the symbols receives 6 bits of user data and the remaining 4 bits are filled with dummy bits.

The DDS according to the present invention performs data dependent scrambling (DDS) using the scrambling seed S. The DDS also guarantees a minimum Hamming weight of 20% using H-code coding. Both S and H are selected from a symbol set that excludes all-zero symbols, the data symbols in the user data sequence and their complements (i.e., bit-wise inversion). In prior DDS, both S and H were appended to the scrambled user data. In the DDS according to the present invention, S is appended to the user data. The dummy bits in the user data sequence are used to specify an offset between S and H, as will be described further below. As a result, H does not need to be appended and the coding overhead of the DDS is reduced.

Figure 2:
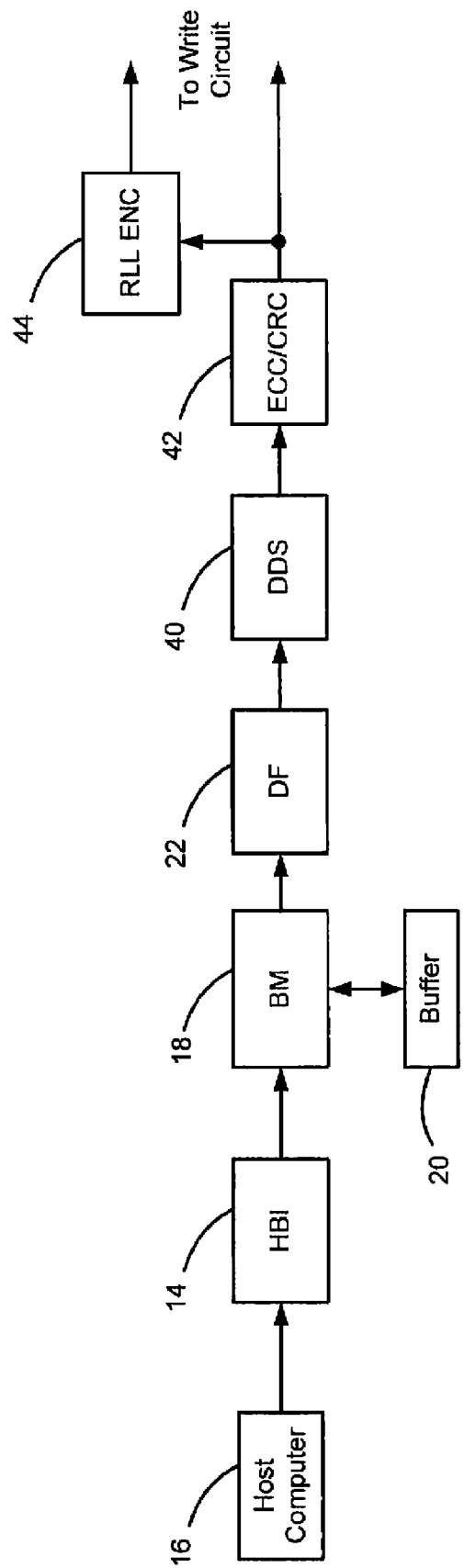
FIG. 2 is a functional block diagram of a data storage system with a data dependent scrambler (DDS) coding according to the prior art.
Figure 3:
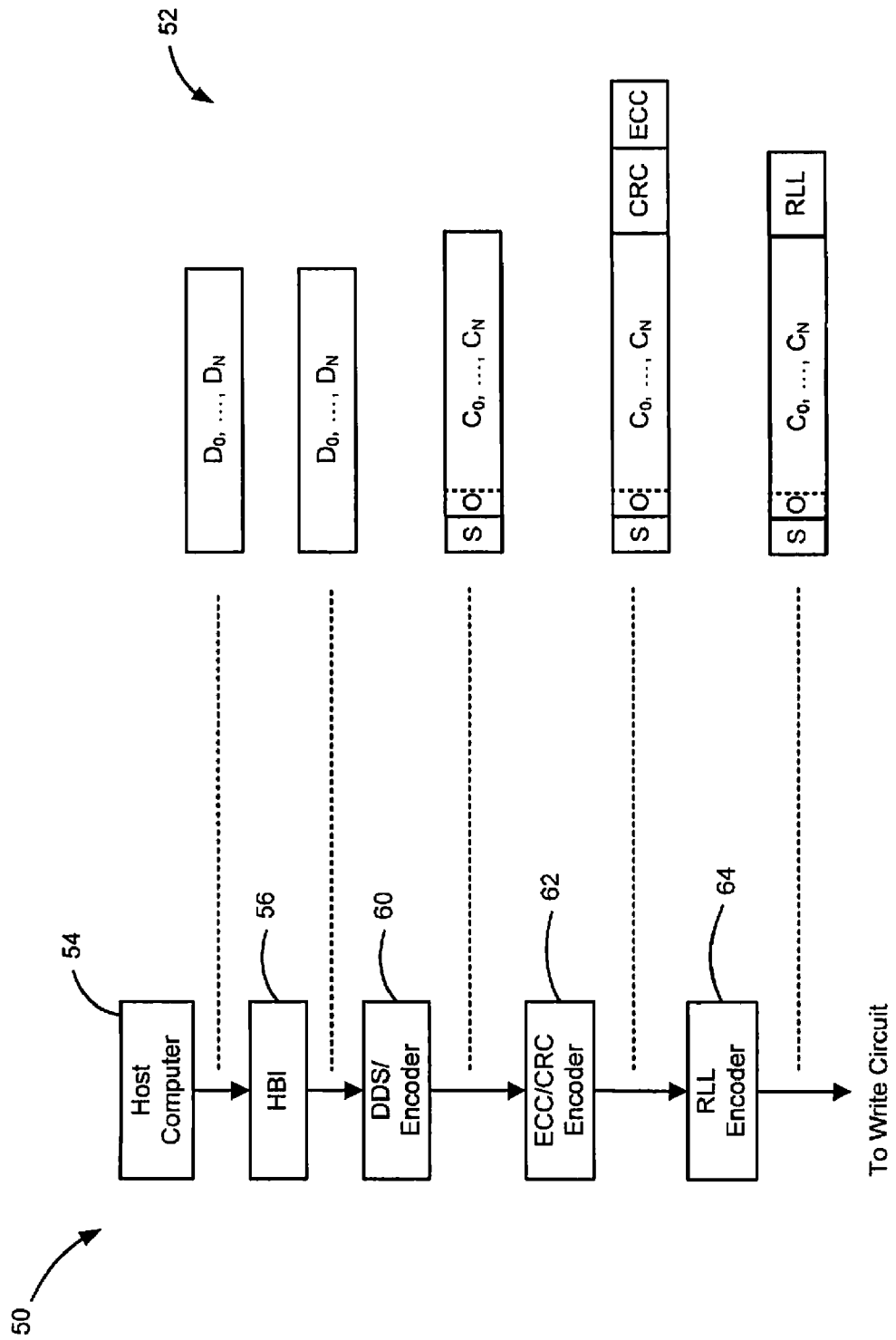
FIG. 3 is a functional block diagram of a write path of a data communication channel according to the present invention and corresponding user data.

Referring now to FIG. 3, a write path 50 of a communications channel is illustrated with a corresponding user data description that is generally identified at 52. A host computer 54 outputs user data to a host bus interface (HBI) 56. Although not illustrated, other elements of the write path 50 may also include the buffer manager 18, the buffer 20, and the disk formatter 22 as shown in FIGS. 1 and 2. A data dependent scrambler (DDS)/encoder 60 receives the user data from the HBI 56 and processes the user data to remove unwanted bit patterns. The scrambled user data from the DDS/encoder 60 is processed by an ECC/CRC encoder 62, which appends CRC bits that are calculated based on the scrambled user data and ECC bits that are calculated based on the scrambled user data and the CRC bits. A RLL encoder 64 encodes the ECC and CRC bits of the scrambled user data to remove any undesired bit patterns in these portions.

The HBI 56 in the write path 50 optionally generates and appends CRC bits to the user data. The CRC bits are generated using the same polynomial and seed as those used in the ECC/CRC encoder 62. The ECC/CRC encoder 62 uses the same CRC bits to detect ECC miscorrections without losing format efficiency.

Figure 4:
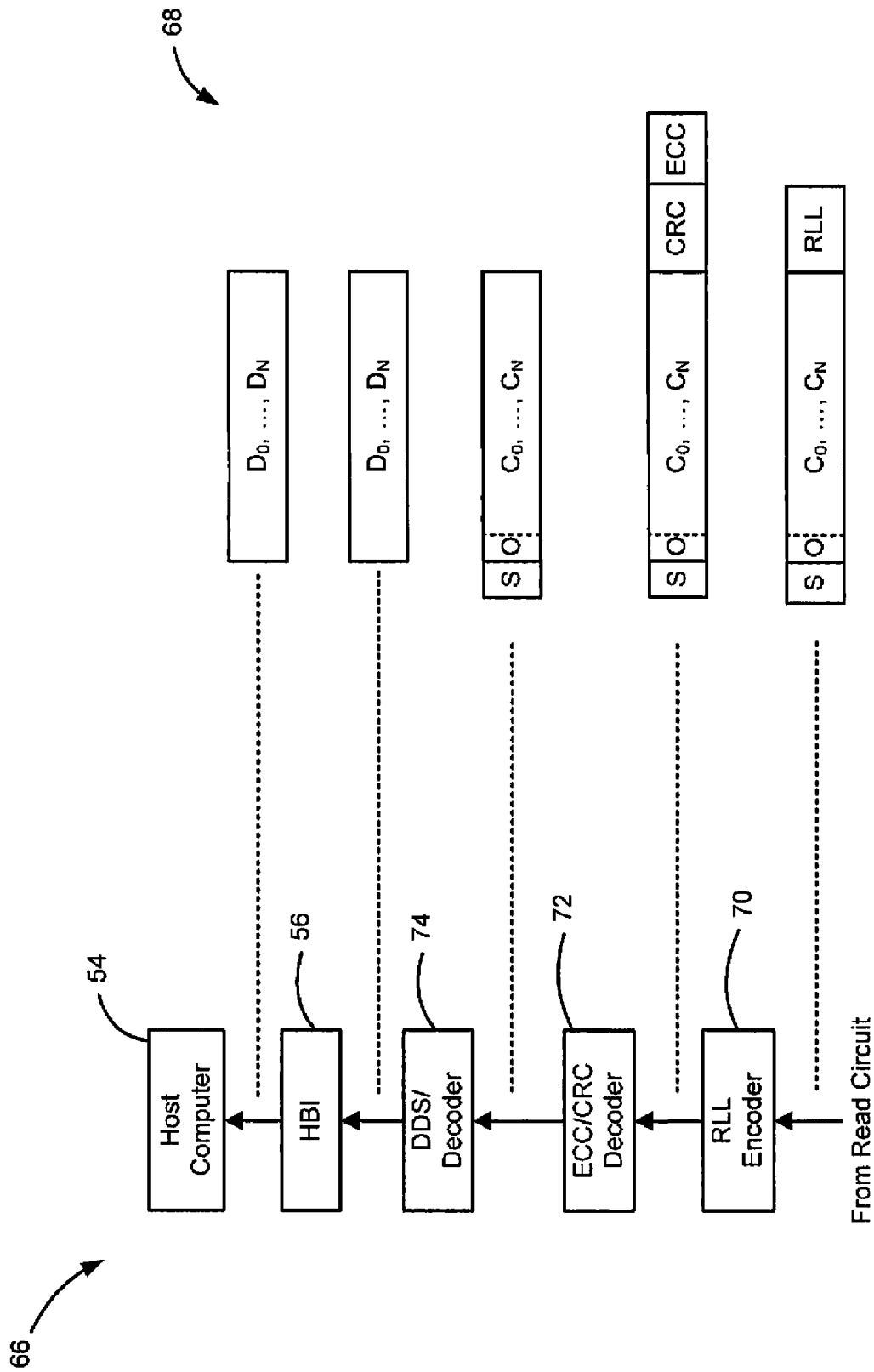
FIG. 4 is a functional block diagram of a read path of the data communication channel according to the present invention and corresponding user data.

Referring now to FIG. 4, components of a read path 66 of the communications channel are illustrated with a corresponding user data description that is generally identified at 68. The read path 66 transfers data from the data storage system to the host computer 54. Although not illustrated, other elements of the read path 66 can include the buffer manager 18, the buffer 20, and the disk formatter 22 shown in FIGS. 1 and 2. A RLL decoder 70 decodes the RLL code that was generated based on the ECC and CRC bits. An ECC/CRC decoder 72 receives the output of the RLL decoder 70 and attempts to correct all possible errors in all portions of the user data. A DDS/decoder 74 reverses the scrambling and encoding that was performed by the DDS/encoder 60.

Figure 5:
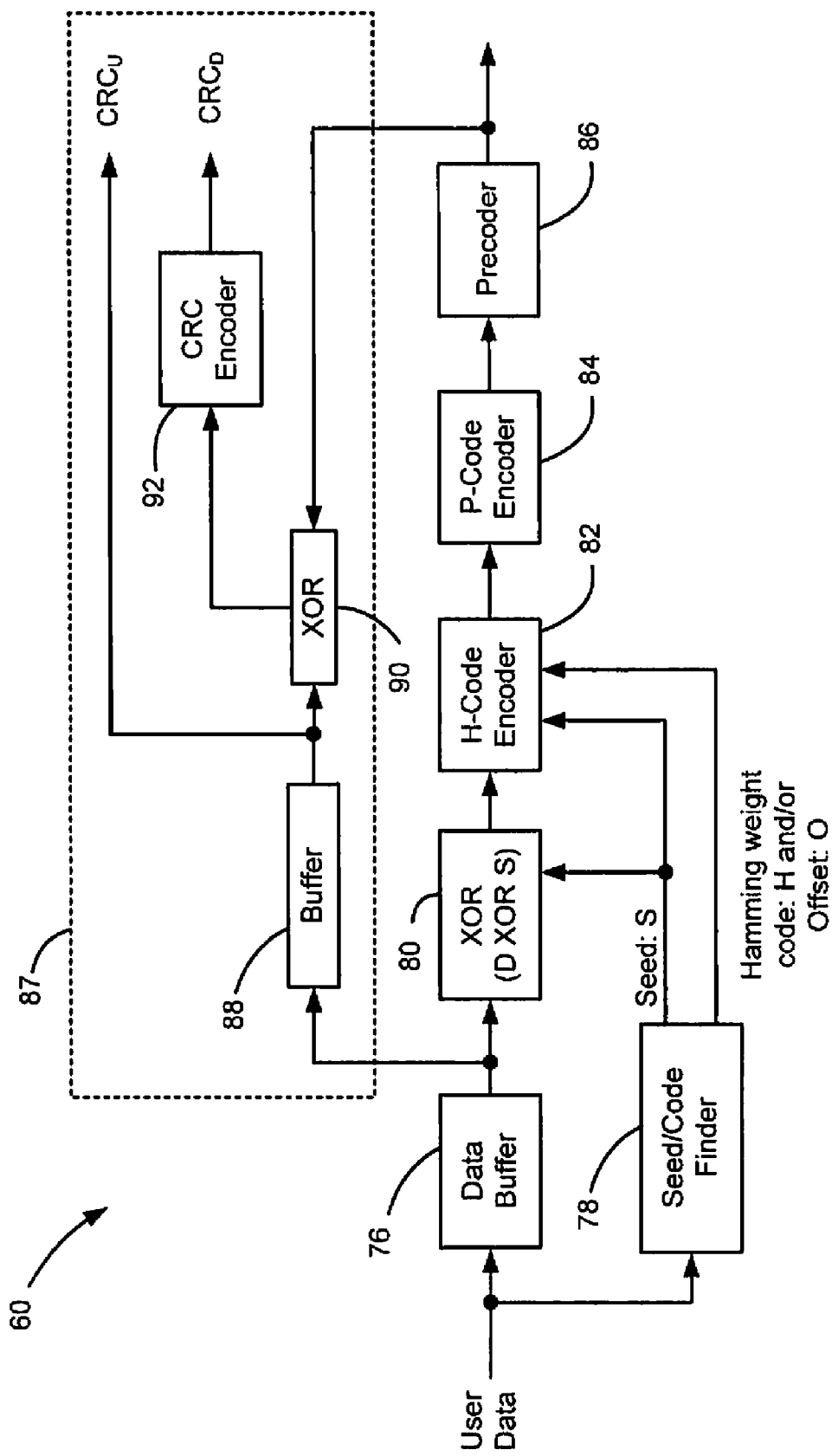
FIG. 5 is a functional block diagram of a data dependent scrambler (DDS) of the data communication channel, which optionally supports host cyclic redundancy check (CRC), according to the present invention.

Referring now to FIG. 5, the DDS/encoder 60 is shown in further detail and includes a data buffer 76 that receives the user data and coordinates data transfer timing through the DDS/encoder 60. A seed/code finder 78 generates a scrambling seed (S) and an H-code token (H) as described in further detail below. A first exclusive OR (XOR) gate 80 performs bit-wise XOR on the user data and the scrambling seed (S) from the seed/code finder 78 to generate a scrambled user data sequence.

An H-code encoder 82 receives the scrambled user data sequence from the XOR gate 80 and the H-code token H and/or the offset from the seed/code finder 78. The H-code encoder 82 encodes the scrambled user data sequence to improve the worst-case Hamming weight thereof, as will be described further below. Alternately, the seed/code finder 78 can calculate S and an offset (O) between S and H. The seed/code finder can transmit S and O to the H-code encoder 82. The H-code encoder 82 stores the offset O in dummy bits in the user data, as will be described below.

When organizing the user data as symbols, there may be extra bits in one symbol that are not used. This occurs when the number of bits in the user data divided by the symbol length M is not an integer. As used herein, the term dummy bits refers to bits that are used to fill unused bit positions in a symbol.

A P-code encoder 84 receives the encoded and scrambled data sequence and encodes the data sequence to limit the maximum length of a run of zeros in the sub-sequences, as will be described further below. The P-code encoder 84 passes the scrambling seed S unchanged. A precoder 86 optionally transfers all data in the interleaved nonreturn-to-zero-inverse (INRZI) or nonreturn-to-zero-inverse (NRZI) domain into the nonreturn-to-zero (NRZ) domain.

If host CRC is supported by the HBI 56, the DDS/encoder 60 includes host CRC coding device 87 that includes a buffer 88 that transfers the user data to a second XOR gate 90 and to the ECC/CRC encoder 62. The second XOR gate 90 performs bit-wise XOR on the user data and the output of the precoder 86 to generate a difference sequence. A CRC encoder 92 outputs $CRC_D$ bits that are generated based on the difference sequence to the ECC/CRC encoder 62 based on the output of the second XOR gate 90. A host CRC supporting DDS is disclosed in "Methods of Supporting Host CRC in Data Storage Systems Without RLL Encoding", U.S. patent application Ser. No. 10/701,271, filed Nov. 5, 2003, which is commonly assigned and is hereby incorporated by reference in its entirety.

The operation of the DDS/encoder 60 will be described with reference to FIG. 3. In this description, an exemplary M-bit symbol data sequence (D=$\{D_{N-1}, D_{N-2}, \ldots, D_0\}$) of size N is used, where M=10 (i.e., 10-bit symbol data sequence). As can be appreciated, any sequence or symbol size can be used. The user data (D) is initially sent to the data buffer 76 and the seed/code finder 78. The user data is output to the first XOR 80. The delay of the data buffer 76 is sufficient to allow the scrambling seed S and H-code token H and/or the offset O to be generated by the seed/code finder 78.

Given the exemplary data sequence D, there are 1023 non-zero 10-bit symbols. More specifically, if the number of bits in the symbol is M, it is always possible to find a seed S if $N<2^M$. This is because not all of the $2^M$ different possible symbols can be included in a data sequence of fewer than $2^M$ symbols. Assuming that the user data includes 4096 bits that are organized into 10-bit symbols, there are at least 203 (1023−2*410) non-zero symbols that are different from any of the data symbols and their complements (i.e., bit-wise inversion). More particularly, the seed/code finder 78 preferably excludes symbols with a Hamming weight of one. S and H are selected such that they are different from any of the user data symbols and their complements. H is also not the complement of S. S is transmitted to the first XOR gate 80 and S and H and/or O are transmitted to the H-code encoder 82.

A scrambling sequence $\{S, S, \ldots, S\}$ is formed by repeating the scrambling seed S N times. The first XOR gate 80 performs bit-wise XOR of the scrambling sequence $\{S, S, \ldots, S\}$ with the data sequence D=$\{D_{N-1}, D_{N-2}, \ldots, D_0\}$ to obtain a scrambled sequence C=$\{C_{N-1}, C_{N-2}, \ldots, C_0\}$. The scrambled data sequence (C=$\{C_{N-1}, C_{N-2}, \ldots, C_0\}$) does not contain either an all-zero symbol or an all-one symbol. At a minimum, each symbol includes one "1" and nine "0"'s, which provides a worst-case Hamming weight of one (or 10% for M=10) for the scrambled user data sequence.

To improve the worst-case Hamming weight of the scrambled user data sequence C, the H-code encoder 82 uses a first token (token$_1$) and its complement (token$_2$) to perform additional coding. An H-code decoder that is associated with the DDS/decoder 74 on the read path 66 reverses the H-code encoding. The H-code encoder 82 generates token$_1$ by calculating S XOR H. Since H is different from any of the user data symbols and their complements, it follows that both token$_1$ and token$_2$ are different from any of the scrambled data symbols of the set C. The H-code encoder 82 appends S to the H-coded data sequence. S is not processed by the P-code encoder 84. As explained in further detail below, the offset O between S and H is recorded in the user data sequence using the dummy bits. In this manner, H can be determined using S and the offset O.

The H-code encoder 82 maps M bit symbols to less than M bit symbols (for example, 10-bits to 6-bits using a look-up table) in certain circumstances described below. The 6-bit patterns have a Hamming weight of at least weight two. The 10-bit to 6-bit look-up table is stored in memory and is static. There are ten symbols with a Hamming weight one and forty-five symbols having a Hamming of weight two. In total, there are fifty-five 10-bit symbols to convert using the table. Further, there are fifteen weight two 6-bit patterns, twenty weight three 6-bit patterns, fifteen weight four 6-bit patterns, six weight five 6-bit patterns and one weight six 6-bit pattern. Therefore, the fifty-five weight one and weight two 10-bit symbols can be converted into fifty-five of the fifty-seven possible 6-bit symbols of weight two or greater. This enables a one-to-one correspondence that is reversible. The dummy bits are used to record the offset of H to S (H−S=O, which is the offset of H relative to S). Therefore, S is appended to the user data sequence and O replaces the dummy bits.

The H-code encoder 82 processes the scrambled symbol set C two symbols at a time. If the total Hamming weight of the two symbol group is at least four, the data is passed on without change. If the total Hamming weight of the two symbol group is two or three (i.e., [1,1] or [1,2]), a symbol replacement occurs. The H-code encoder 82 inserts token$_1$ for the symbol on the left (i.e., the first symbol of the two-symbol set). For the symbol on the right (i.e., the second symbol of the two-symbol set), the first four bits of the 10-bit symbol are used to indicate the position of the "1" in the symbol having the Hamming weight of one. The second symbol is converted into a 6-bit symbol using the table described above. If the Hamming weight of the two-symbol group is three with [2,1], the H-code encoder 82 inserts token$_2$ on the left. The H-code encoder 82 uses the first four bits of the 10-bit symbol to indicate the position of the "1" in the Hamming weight one symbol. The second symbol is converted into a 6-bit symbol using the table described above.

A more detailed description of the operation and function of the H-code encoder 82 is provided in co-pending U.S. patent application Ser. No. 10/639,796, entitled "Methods and Apparatus for Improving Minimum Hamming Weights of a Sequence", filed on Aug. 12, 2003, which is commonly assigned and which is incorporated herein by reference in its entirety.

The H-coded scrambled data sequence does not contain either the all-zero symbol or the all-one symbol. As a result, there are at most eighteen consecutive zeros in the H-coded data sequence. However, it is still possible to have a long run of zeros in the sub-sequences. The P-code encoder 84 limits the maximum length of a run of zeros in the sub-sequences.

The P-code encoder 84 selects two symbols of the H-code data sequence at a time, for example symbol a ($a_0, \ldots, a_9$) and symbol b ($b_0, \ldots, b_9$). The P-code encoder 84 processes symbols a and b by checking the results after bit-interleaving. The P-code encoder 84 preferably does not process the scrambling seed (S). The P-code encoder 84 determines whether one of the potentially interleaved symbols is all-zero. If one of the potentially interleaved symbols is all zero, bit interleaving is performed as follows:

($a_0, b_0, a_2, b_2, a_4, b_4, a_6, b_6, a_8, b_8$); and
($a_1, b_1, a_3, b_3, a_5, b_5, a_7, b_7, a_9, b_9$)

If the potentially interleaved symbols are not the all-zero symbol, nothing occurs and the P-code encoder 84 processes the next two symbols. If bit-interleaving does occur, an all-zero symbol is generated and the other non-zero symbol has a Hamming weight of at least four. If the non-zero symbol is the all-one symbol, nothing occurs. If the non-zero symbol is not the all-one symbol, the all-zero symbol is replaced by the all-one symbol.

A P-code decoder, which is associated with the DDS/decoder 74 on the read path 66, reverses the P-code encoding process that is described above. If, in a group of two symbols, there is an all-one symbol and an all-zero symbol, bit interleaving occurs as described above. If, in the group, there is an all-one symbol and the other symbol is not the all-zero symbol, the all-one symbol is replaced by the all-zero symbol. Bit interleaving is then performed on the symbol group. Bit interleaving of the two symbols in the group may generate symbols that are the same as either token$_1$ or token$_2$. This, however, does not create any difficulties on the read path 66 because the P-code decoder processes the data before the H-code decoder. Further, the P-code decoded data sequence does not contain any tokens other than those generated by the H-code encoder 82.

As a result of the P-code encoding, the global constraint (G) is slightly increased. The longest length of a run of zeros is 2*M, where M is the symbol size. The interleave constraint (I) is 2*(M−1). The longest length of a run of ones is 4*M−2. In the case of a 10-bit symbol, the DDS achieves a G=20, I=18 and a minimum Hamming weight of 20%. Additionally, because only S is appended to the user data sequence, there is reduced overhead. More specifically, by using the dummy bits to record the offset O, a 410/411 RLL code rate is achieved for use data with 4096 bits, N=410 and M=10.

Figure 6:
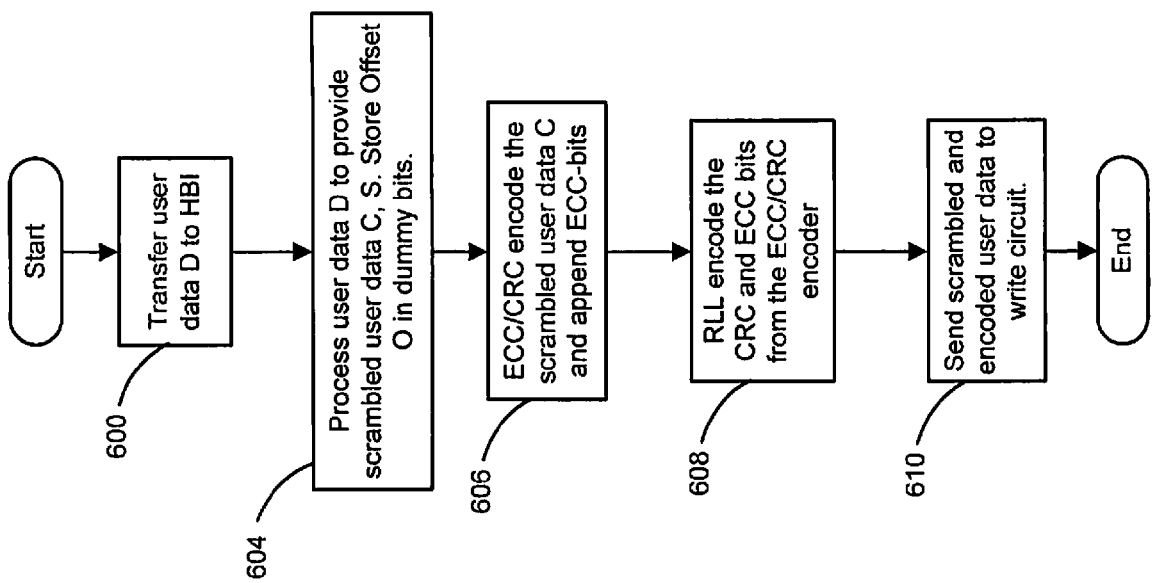
FIG. 6 is a flowchart illustrating user data processing along the write path of the data communication channel.

Referring now to FIGS. 3 and 6, the scrambling and encoding process along the write path 50 is outlined. In step 600, the user data D is transferred to the HBI 56. The user data D is processed through the DDS/encoder 60 in step 604. The output of the DDS/encoder 60 includes the scrambled user data C and the seed S. The offset O is stored in dummy bits of the scrambled user data. In step 606, the ECC/CRC encoder 62 processes the output of the DDS/encoder 60 to provide the scrambled user data C having S, CRC and the ECC-bits appended thereto (O is stored in the dummy bits). The RLL encoder 64 processes the output of the ECC/CRC encoder 62 to encode the CRC and ECC portion in step 608. The output of the RLL encoder 64 includes the scrambled user data C having S and the RLL-bits appended thereto (O stored in dummy bits). In step 610, the output of the RLL encoder 64 is sent to the write circuit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A scrambling system, comprising:
    a seed finder that selects a scrambling seed;
    a first scrambler that generates a scrambled sequence in response to a user data sequence and the scrambling seed;
    a code finder that generates at least one of a token and an offset of the token from the scrambling seed; and
    an encoder that increases a Hamming weight of the scrambled sequence in response to the at least one of the token and the offset.

2. The scrambling system of claim 1, wherein the scrambling seed and the token are selected in response to symbols in the user data sequence.

3. The scrambling system of claim 1, wherein at least one of the symbols of the user data sequence includes dummy bits and wherein the encoder stores the offset in the dummy bits.

4. The scrambling system of claim 1, wherein the user data sequence includes Y dummy bits, the symbols include M bits, the user data sequence includes X bits, and Y is equal to M minus a remainder of X divided by M.

5. The scrambling system of claim 1 further comprising an encoder that encodes the scrambled sequence and that appends at least one of error correction code (ECC) and cyclic redundancy check (CRC) bits to the scrambled sequence.

6. The scrambling system of claim 5, wherein the encoder outputs the scrambled sequence to a run length limited (RLL) encoder that generates a RLL sequence that is based on the ECC and CRC bits.

7. The scrambling system of claim 5 further comprising an interleaving encoder an encoder that encodes the scrambled sequence and that reduces a number of consecutive zeros in interleaved subsequences of the scrambled sequence.

8. The scrambling system of claim 1, wherein the first scrambler performs a bitwise exclusive (XOR) operation.

9. A scrambling system, comprising:
    a host bus interface (HBI) that transmits a user data sequence including a plurality of symbols; and
    a scrambler that communicates with the HBI, that scrambles the user data using a scrambling seed, that increases a Hamming weight of the scrambled sequence using a token, that calculates an offset between the scrambling seed and the token, and that stores the offset in dummy bits of at least one symbol of the scrambled sequence.

10. The scrambling system of claim 9, wherein the scrambler selects a scrambling seed in response to the plurality of symbols of the user data sequence.

11. The scrambling system of claim 9, wherein the scrambler includes a seed finder that generates the scrambling seed.

12. The scrambling system of claim 11, wherein the scrambler further includes:
- a token finder that generates at least one of the token and an offset of the token from the scrambling seed; and
- an encoder that increases a Hamming weight of the scrambled sequence in response to the at least one of the token and the offset.

13. The scrambling system of claim 9, wherein the user data sequence includes X bits organized as N M-bit symbols, wherein at least one symbol includes Y dummy bits, and wherein Y is equal to M minus a remainder of X divided by M.

14. The scrambling system of claim 9 further comprising:
- a buffer manager that receives the user data sequence from the HBI;
- a buffer that communicates with the buffer manager; and
- a disk formatter that communicates with the buffer manager.

15. The scrambling system of claim 11 further comprising an encoder that encodes the scrambled sequence and that appends at least one of error correction coding (ECC) and cyclic redundancy check (CRC) bits to the scrambled sequence.

16. The scrambling system of claim 15 further comprising a run length limited (RLL) encoder that generates a RLL sequence that is based on the ECC and CRC bits.

17. The scrambling system of claim 15 further comprising an interleaving encoder that receives the scrambled sequence from the encoder and that reduces the number of consecutive zeros in interleaved subsequences of the scrambled sequence.

18. The scrambling system of claim 9, wherein the scrambler performs a bitwise exclusive (XOR) operation.

* * * * *